US010555101B2

(12) United States Patent
Warden et al.

(10) Patent No.: US 10,555,101 B2
(45) Date of Patent: Feb. 4, 2020

(54) PORTABLE SPEAKER CONFIGURATIONS

(71) Applicant: Bose Corporation, Framingham, MA (US)

(72) Inventors: Robert Warden, Southborough, MA (US); Paul F. Fidlin, Wayland, MA (US); Akira Mochimaru, Natick, MA (US); Craig Jackson, Waltham, MA (US); Gregor Mittersinker, Providence, RI (US); Richard Carbone, Sterling, MA (US); Greg J. Zastoupil, North Grafton, MA (US); Kevin Brousseau, Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/373,000

(22) Filed: Apr. 2, 2019

(65) Prior Publication Data
US 2019/0230457 A1    Jul. 25, 2019

Related U.S. Application Data

(63) Continuation of application No. 15/634,081, filed on Jun. 27, 2017, now Pat. No. 10,306,386.

(51) Int. Cl.
*H04R 27/00* (2006.01)
*H04R 1/02* (2006.01)
(Continued)

(52) U.S. Cl.
CPC .............. *H04R 27/00* (2013.01); *G06F 3/165* (2013.01); *H04R 1/02* (2013.01); *H04R 1/025* (2013.01);
(Continued)

(58) Field of Classification Search
CPC .......... H04R 27/00; H04R 1/02; H04R 1/025; H04R 3/04; H04R 1/24; H04R 2201/025; H04R 2420/07; G06F 3/165
See application file for complete search history.

(56) References Cited

U.S. PATENT DOCUMENTS 3,778,551 A    12/1973  Grodinsky
4,227,051 A    10/1980  Thomas et al.
(Continued)

FOREIGN PATENT DOCUMENTS

CN    102026053 B    7/2013
CN    203178889 U    9/2013
(Continued)

OTHER PUBLICATIONS

Final Office Action in U.S. Appl. No. 15/634,508 dated Apr. 5, 2019; 19 pages.
(Continued)

*Primary Examiner* — Yogeshkumar Patel
(74) *Attorney, Agent, or Firm* — Schmeiser, Olsen & Watts LLP; Timothy P. Collins

(57) ABSTRACT

A portable public address (PA) speaker comprises an enclosure constructed and arranged for positioning at a first position having a vertical orientation to output audio shaped for a first acoustic coverage area, a second position having an angular orientation to output audio shaped for a second acoustic coverage area, and a third position having a horizontal orientation to output audio shaped for a third acoustic coverage area. The weight of the speaker rests on a bottom surface of a base when in the first position having the vertical orientation or the second position having the angular orientation. The weight of the speaker rests on a side surface when in the third position having the horizontal orientation.

20 Claims, 11 Drawing Sheets

(51) Int. Cl.
*G06F 3/16* (2006.01)
*H04R 1/24* (2006.01)
*H04R 3/04* (2006.01)

(52) U.S. Cl.
CPC .............. *H04R 1/24* (2013.01); *H04R 3/04* (2013.01); *H04R 2201/025* (2013.01); *H04R 2420/07* (2013.01)

(56) References Cited

U.S. PATENT DOCUMENTS

| | | | |
|---|---|---|---|
| 4,314,620 | A | 2/1982 | Gollehon |
| 4,704,553 | A | 11/1987 | Resnicow |
| 4,837,839 | A | 6/1989 | Andrews |
| 5,771,154 | A | 6/1998 | Goodman et al. |
| 6,243,472 | B1 | 6/2001 | Bilan et al. |
| 6,259,798 | B1 | 7/2001 | Perkins et al. |
| 6,453,378 | B1 | 9/2002 | Olson et al. |
| 6,477,799 | B1 * | 11/2002 | Erickson ............ G09F 19/02 40/406 |
| 6,723,913 | B1 | 4/2004 | Barbetta |
| 6,944,024 | B1 | 9/2005 | Devine, III |
| 7,302,061 | B2 | 11/2007 | Rivera |
| 7,475,506 | B2 | 1/2009 | Hernandez et al. |
| 8,051,592 | B2 | 11/2011 | Chang |
| 8,126,180 | B2 | 2/2012 | Jacob et al. |
| 8,135,158 | B2 | 3/2012 | Fincham |
| 8,189,823 | B2 | 5/2012 | Tezuka et al. |
| 8,561,756 | B2 | 10/2013 | Litovsky et al. |
| 8,646,195 | B2 | 2/2014 | Fu et al. |
| 9,294,842 | B2 | 3/2016 | Qiu |
| 2006/0039571 | A1 | 2/2006 | Harris et al. |
| 2006/0083396 | A1 | 4/2006 | Kung |
| 2010/0111342 | A1 | 5/2010 | Jacob et al. |
| 2011/0164774 | A1 | 7/2011 | Gladwin |
| 2013/0022221 | A1 | 1/2013 | Kallai et al. |
| 2013/0251188 | A1 * | 9/2013 | Hatton ............... H04R 1/02 381/390 |
| 2013/0314619 | A1 | 11/2013 | Sugiura et al. |
| 2014/0050344 | A1 | 2/2014 | Hilderman et al. |
| 2015/0201255 | A1 * | 7/2015 | Porter ............... H04R 1/00 381/334 |
| 2015/0281866 | A1 * | 10/2015 | Williams ........... H04R 1/026 381/56 |
| 2015/0289037 | A1 | 10/2015 | Kutil et al. |
| 2016/0205466 | A1 | 7/2016 | Lim |
| 2016/0337756 | A1 | 11/2016 | Oliveira et al. |

FOREIGN PATENT DOCUMENTS

| | | |
|---|---|---|
| CN | 203995589 U | 12/2014 |
| CN | 205693881 U | 11/2016 |
| CN | 205726396 U | 11/2016 |
| CN | 205987244 U | 2/2017 |
| DE | 202007015371 U1 | 4/2009 |
| JP | 6269076 A | 9/1994 |
| JP | 2000148027 A | 5/2000 |
| JP | 200423148 A | 1/2004 |
| JP | 2005300618 A | 10/2005 |
| KR | 2002-0093316 A * | 12/2002 |
| KR | 2002-0093316 A | 12/2002 |
| TW | 201409433 A | 3/2014 |
| TW | I448160 B | 8/2014 |
| WO | 9903375 A1 | 1/1999 |
| WO | 2007042047 A2 | 4/2007 |
| WO | 2016135517 A2 | 9/2016 |

OTHER PUBLICATIONS

Related U.S. Appl. No. 15/634,508, filed Jun. 27, 2017; 22 pages.
Related U.S. Appl. No. 15/634,740, filed Jun. 27, 2017; 20 pages.
Notice of Allowance in U.S. Appl. No. 15/634,740, dated Nov. 21, 2017; 9 pages.
Non-Final Office Action in U.S. Appl. No. 15/634,740, dated Mar. 6, 2018; 17 pages.
Non-Final Office Action in U.S. Appl. No. 15/634,081 dated Jun. 13, 2018; 16 pages.
Notice of Allowance in U.S. Appl. No. 15/634,740, dated Aug. 8, 2018; 8 pages.
Notice of Allowance in U.S. Appl. No. 15/634,081, dated Feb. 14, 2019; 10 pages.
Final Office Action in U.S. Appl. No. 15/634,081, dated Oct. 25, 2018; 20 pages.
International Search Report & Written Opinion in PCT/US2018/034357 dated Aug. 14, 2018; 21 pages.
International Search Report & Written Opinion in PCT/US2018/033840 dated Jul. 23, 2018; 16 pages.
International Search Report & Written Opinion in PCT/US2018/028527 dated Jul. 13, 2018; 21 pages.
Non-Final Office Action in U.S. Appl. No. 15/634,508 dated Oct. 2, 2018; 13 pages.
Notice of Allowance in U.S. Appl. No. 15/634,508 dated Aug. 27, 2019; 8 pages.

* cited by examiner

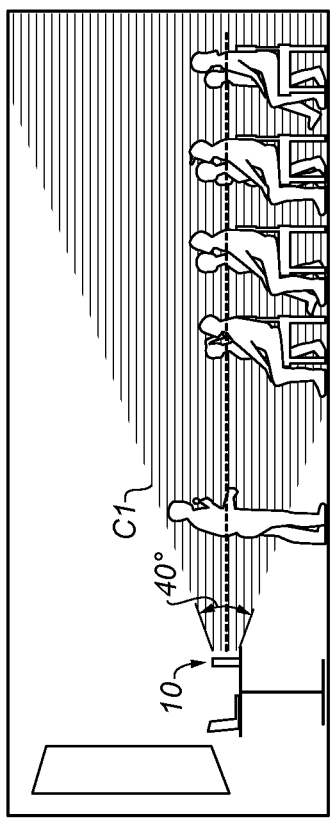
FIG. 2A(1)
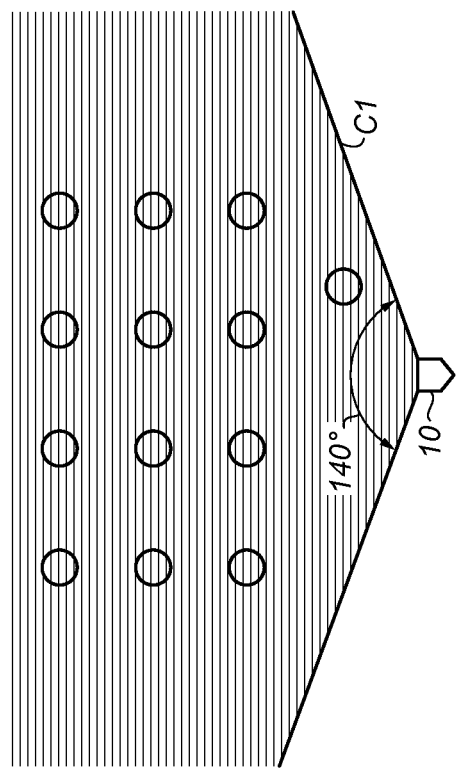
FIG. 2A(2)
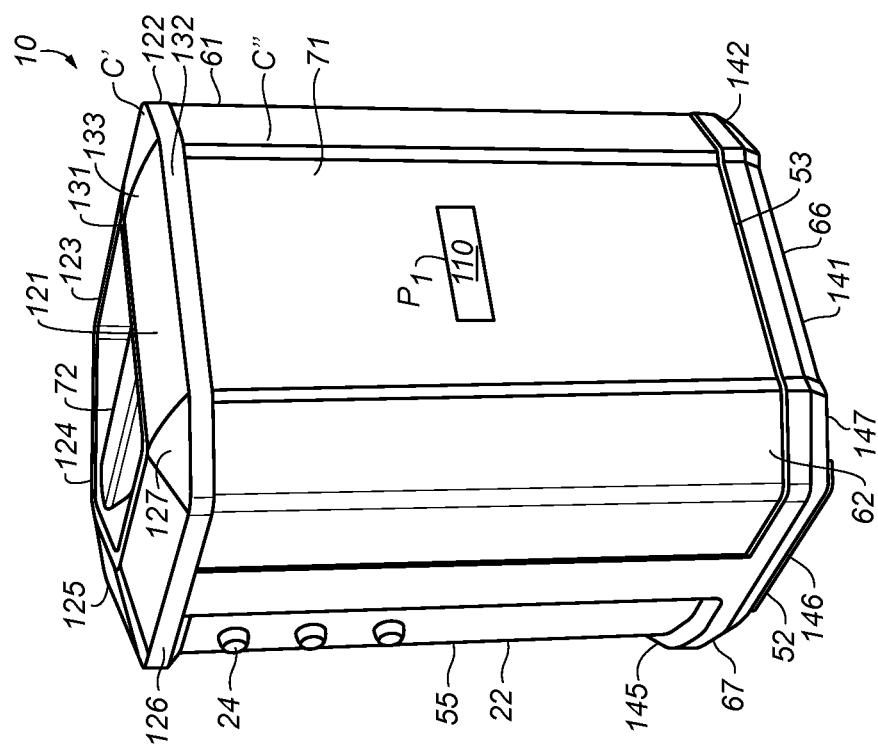
FIG. 1A

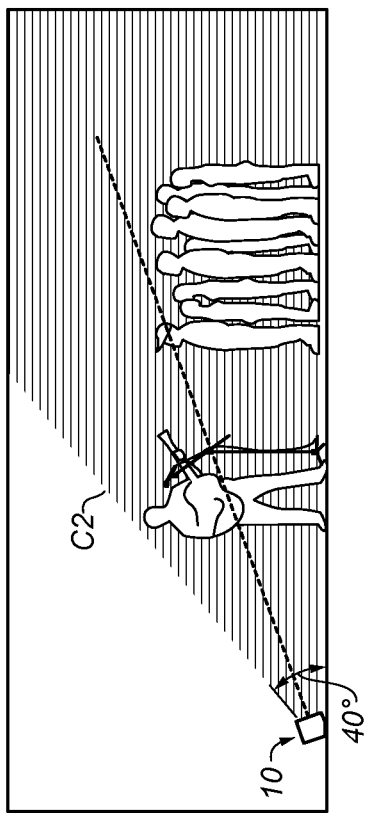
FIG. 2B(1)
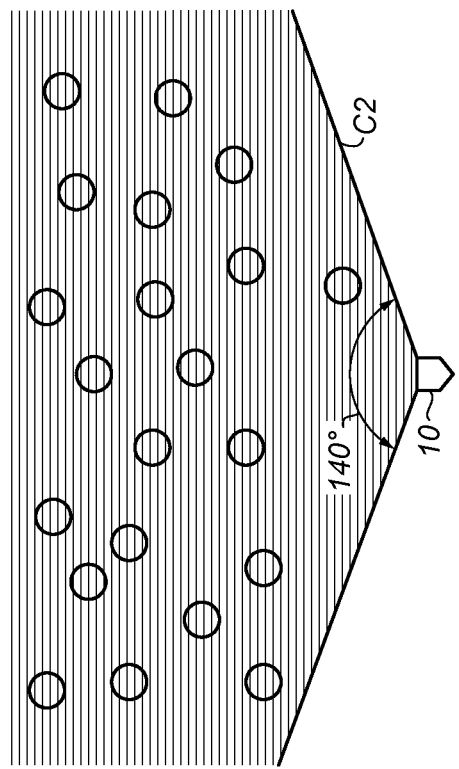
FIG. 2B(2)
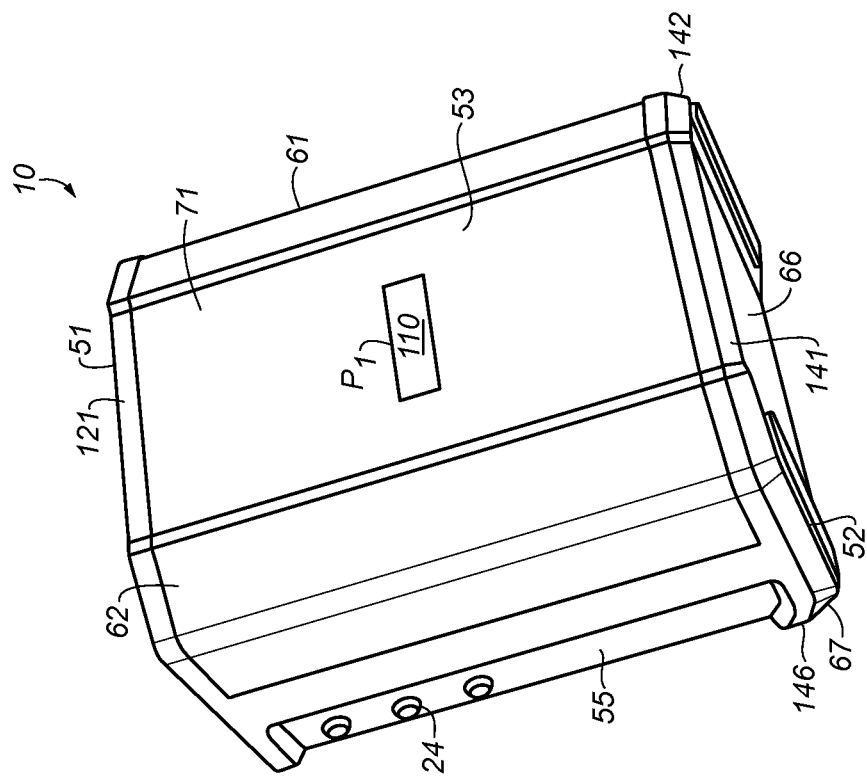
FIG. 1B

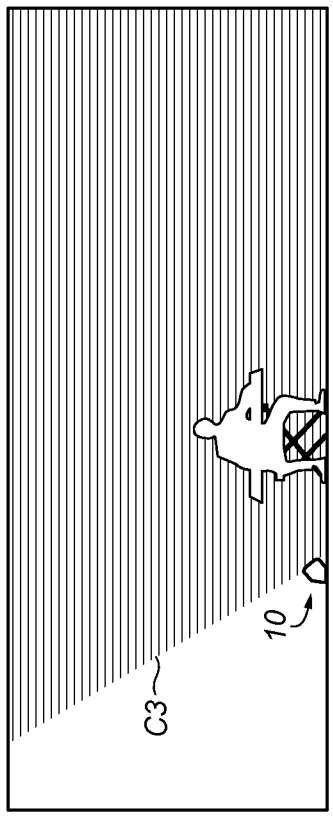
FIG. 2C(1)
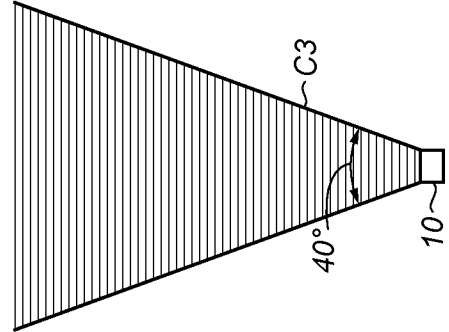
FIG. 2C(2)
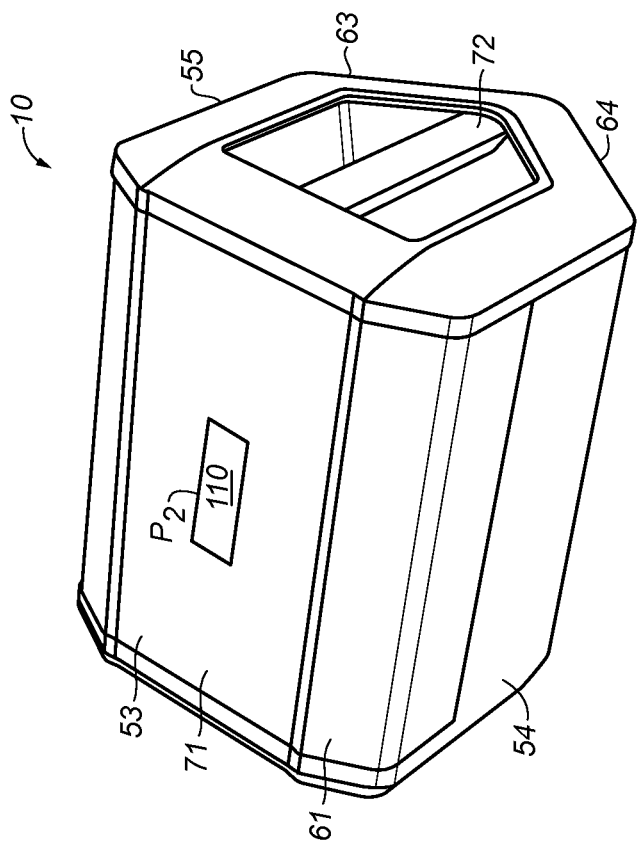
FIG. 1C

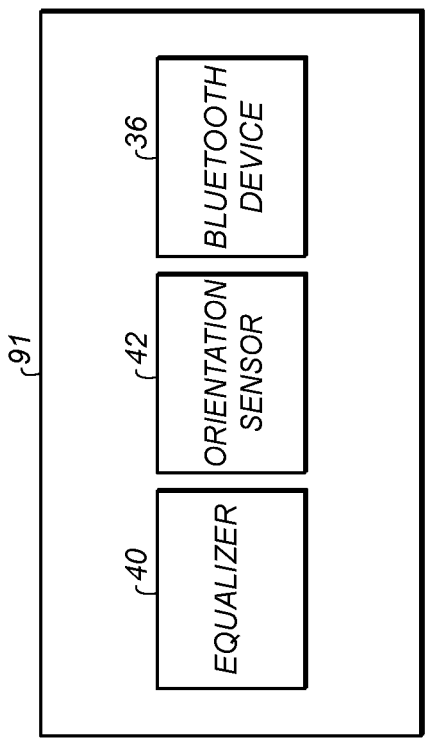
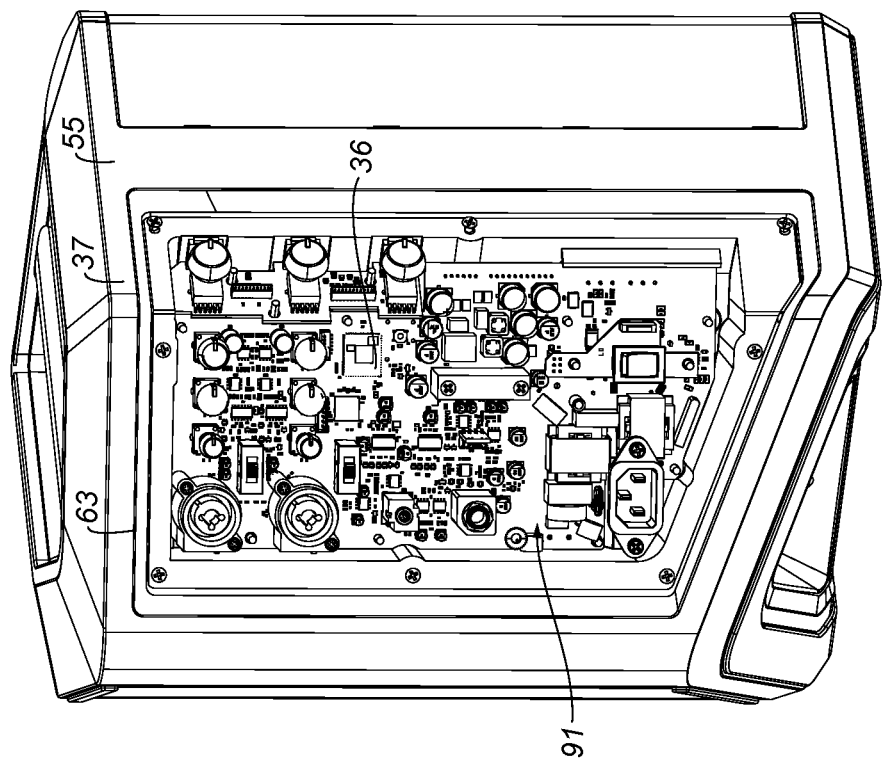
FIG. 5B
FIG. 5A

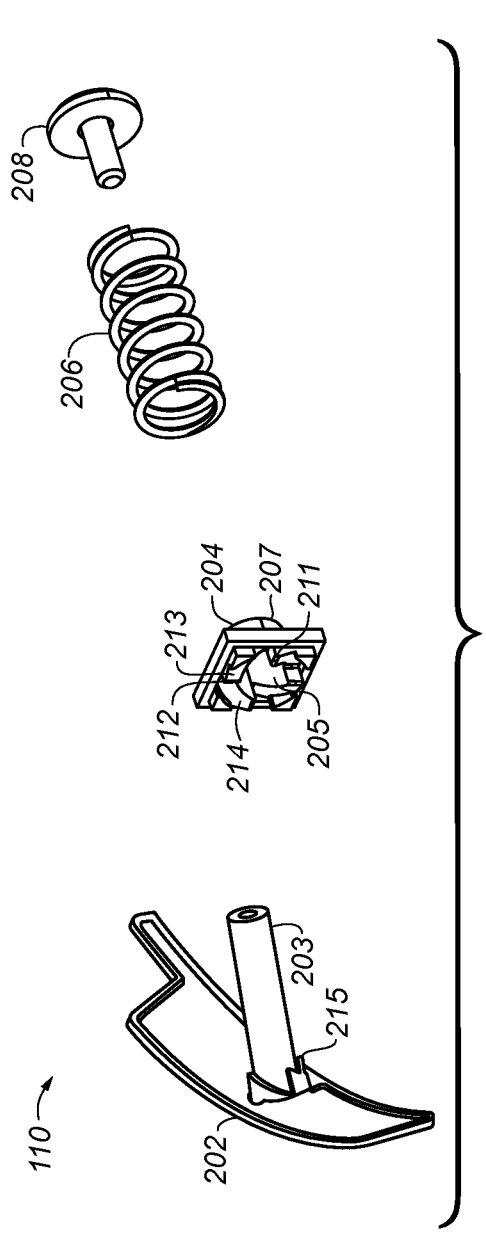
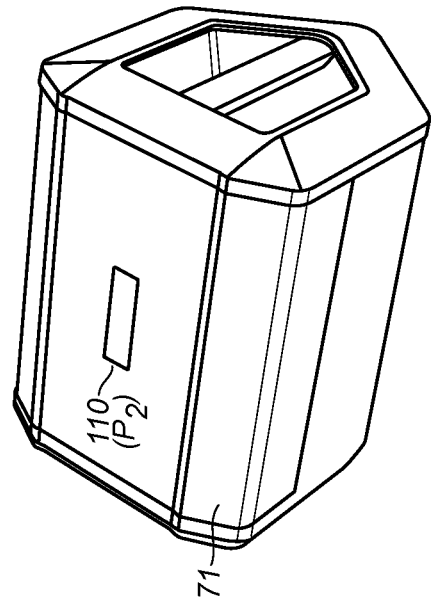
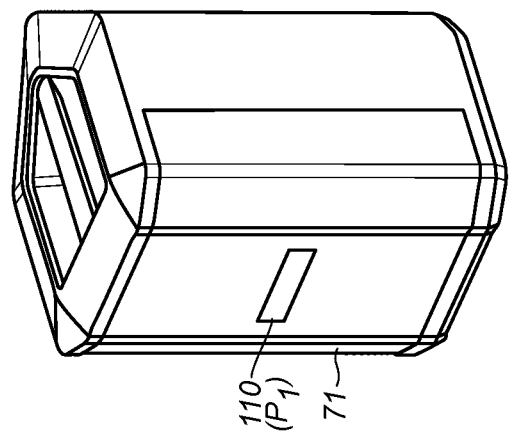
FIG. 9
FIG. 10A
FIG. 10B

PORTABLE SPEAKER CONFIGURATIONS

RELATED APPLICATIONS

This application is a continuation application of U.S. patent application Ser. No. 15/634,081 filed Jun. 27, 2017 and entitled "Portable Speaker Configurations," the contents of which are incorporated by reference herein in their entirety.

BACKGROUND

This description relates generally to acoustic speakers, and more specifically, to portable public address (PA) loudspeaker systems.

BRIEF SUMMARY

In accordance with one aspect, a portable public address (PA) speaker comprises an enclosure, comprising a top portion; a base; a plurality of side surfaces extending between the top portion and the base; and a speaker in the enclosure that outputs sound through a first side surface of the plurality of side surfaces. The enclosure is constructed and arranged for positioning at a first position having a vertical orientation to output audio shaped for a first acoustic coverage area, a second position having an angular orientation to output audio shaped for a second acoustic coverage area, and a third position having a horizontal orientation to output audio shaped for a third acoustic coverage area. The weight of the speaker rests on a bottom surface of the base when in the first position having the vertical orientation or the second position having the angular orientation. The weight of the speaker rests on a side surface other than the first side surface when in the third position having the horizontal orientation.

Aspects may include one or more of the following features.

The top portion may include a tapered border that forms a cavity, and further includes a handle in the cavity.

The top portion may include a plurality of wall portions, each aligned with a side surface of the plurality of side surfaces.

The portable PA loudspeaker system may further comprise a plurality of control elements extending from at least one side surface. A width of each of the top portion and base may be greater than a width of a combination of the control elements and a portion of the enclosure formed by the at least one side surface.

The control elements may be visible and accessible to a user in each of the first, second, and third positions of the enclosure.

The bottom surface of the base may comprise a flat bottom surface and an angled bottom surface extending from the flat bottom surface. The weight of the speaker may rest on the flat bottom surface of the base when in the first position having the vertical orientation. The weight of the speaker may rest on the angled bottom surface of the base when in the second position having the angular orientation.

The base may include a plurality of wall portions that extend from the flat bottom surface and angled bottom surface each aligned with a side surface of the plurality of side surfaces.

The portable PA loudspeaker system may further comprise a first compressible foot at the flat bottom surface of the base, and at the angled bottom surface of the base, and a second compressible foot at the side surface other than the first side surface.

The portable PA loudspeaker system may further comprise a pole mount in the angled bottom surface, for receiving a pole for positioning the portable PA loudspeaker system above a ground surface. The pole mount may be positioned to (1) allow a user to insert the pole, (2) separate a battery from heat-generating sources in the enclosure, and (3) improve a center of gravity.

The portable PA loudspeaker system may further comprise a circuit board comprising a wireless data interface device constructed and arranged to establish or maintain a communication with an electronic device in any of the first, second, or third positions of the enclosure.

The portable PA loudspeaker system may further comprise an omni-direction wireless antenna at the top portion in communication with the wireless data interface device on the circuit board.

The portable PA loudspeaker system may further comprise a rotatable nameplate assembly that rotates to accommodate either the horizontal, angular, or vertical orientation of the enclosure. The rotatable nameplate assembly may comprise a nameplate in communication with an alignment part, the alignment part including four elements that permit rotation of the nameplate in one of four different positions, each 90 degrees from each other.

In accordance with another aspect, a portable public address (PA) speaker comprises an enclosure, comprising: a top portion; a base; a plurality of side surfaces extending between the top portion and the base; and a speaker in the enclosure that outputs sound through a first side surface of the plurality of side surfaces. The enclosure is constructed and arranged for positioning at a first position having a vertical orientation to output audio shaped for a first acoustic coverage area, a second position having an angular orientation to output audio shaped for a second acoustic coverage area, and a third position having a horizontal orientation to output audio shaped for a third acoustic coverage area. The speaker further comprises a rotatable nameplate assembly that rotates to accommodate either the horizontal, angular, or vertical orientation of the enclosure.

Aspects may include one or more of the following features.

The rotatable nameplate assembly may comprise a nameplate in communication with an alignment part, the alignment part including four elements that permit rotation of the nameplate in one of four different positions, each 90 degrees from each other.

The weight of the speaker may rest on a bottom surface of the base when in the first position having the vertical orientation or the second position having the angular orientation, and wherein the weight of the speaker rests on a side surface other than the first side surface when in the third position having the horizontal orientation.

In accordance with another aspect, a portable public address (PA) speaker comprises an enclosure, comprising a top portion; a base; a plurality of side surfaces extending between the top portion and the base; and a speaker in the enclosure that outputs sound through a first side surface of the plurality of side surfaces. The enclosure is constructed and arranged for positioning at a first position having a vertical orientation to output audio shaped for a first acoustic coverage area, a second position having an angular orientation to output audio shaped for a second acoustic coverage area, and a third position having a horizontal orientation to output audio shaped for a third acoustic coverage area. The circuit board comprises a wireless data interface device constructed and arranged to establish or maintain a communication with an electronic device in any of the first, second, or third positions of the enclosure.

Aspects may include one or more of the following features.

The portable PA loudspeaker system may further comprise an omni-direction wireless antenna at the top portion in communication with the wireless data interface device on the circuit board.

The weight of the speaker may rest on a bottom surface of the base when in the first position having the vertical orientation or the second position having the angular orientation, and wherein the weight of the speaker rests on a side surface other than the first side surface when in the third position having the horizontal orientation.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 1A is a perspective view of a portable powered public address (PA) loudspeaker system oriented in a first position, in accordance with some examples.

FIG. 1B is a perspective view of the portable powered PA loudspeaker system of FIG. 1A oriented in a second position.

FIG. 1C is a perspective view of the portable powered PA loudspeaker system of FIGS. 1A and 1B oriented in a third position.

FIGS. 2A(1) and (2) are illustrations of acoustic coverage of the PA loudspeaker system oriented in the first position shown in FIG. 1A.

FIGS. 2B(1) and (2) are illustrations of acoustic coverage of the PA loudspeaker system oriented in the second position shown in FIG. 1B.

FIGS. 2C(1) and (2) are illustrations of acoustic coverage of the PA loudspeaker system oriented in the third position shown in FIG. 1C.

Figure 3:
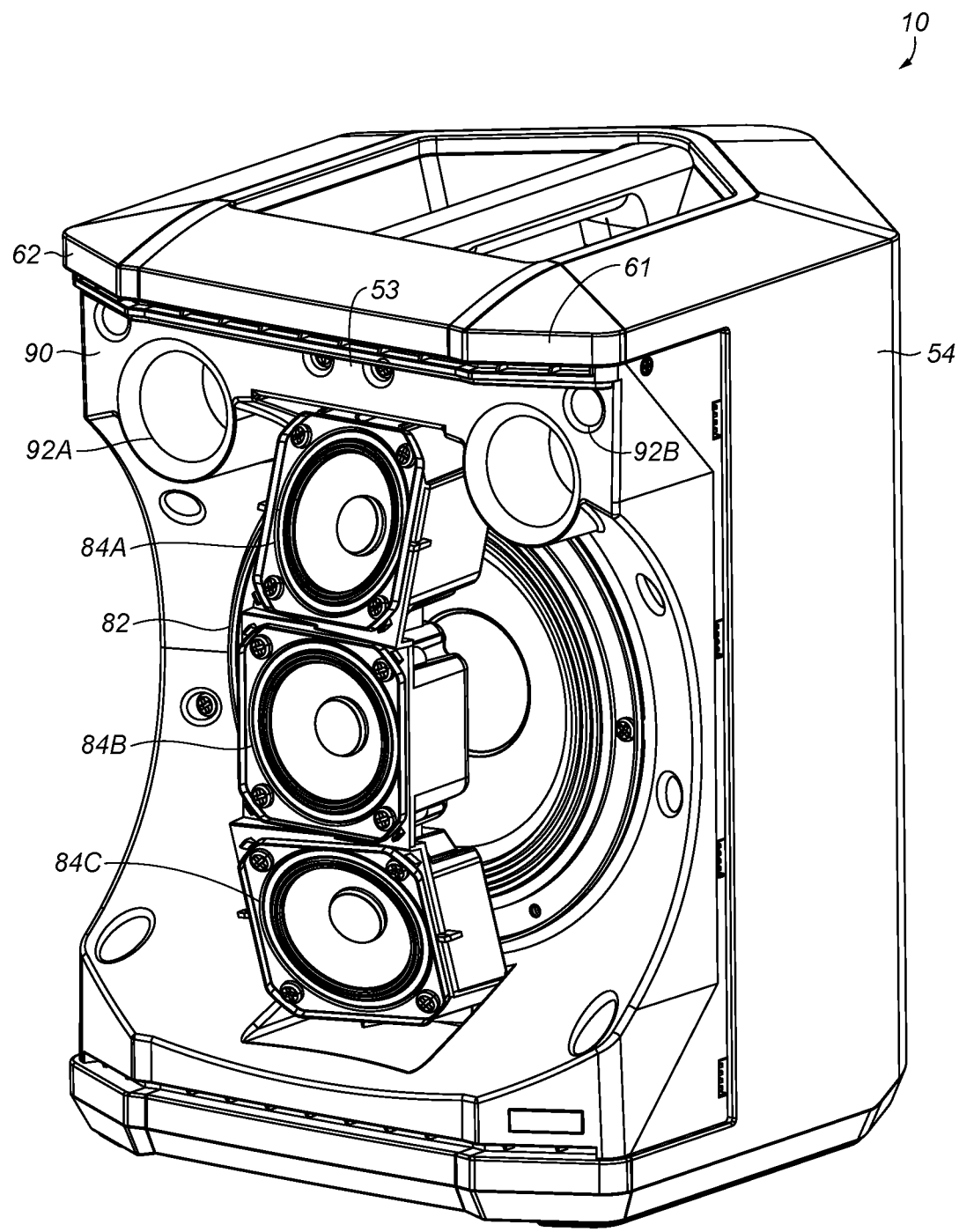

FIG. 3 is a perspective view of an interior of a PA loudspeaker system, in accordance with some examples.

Figure 4:
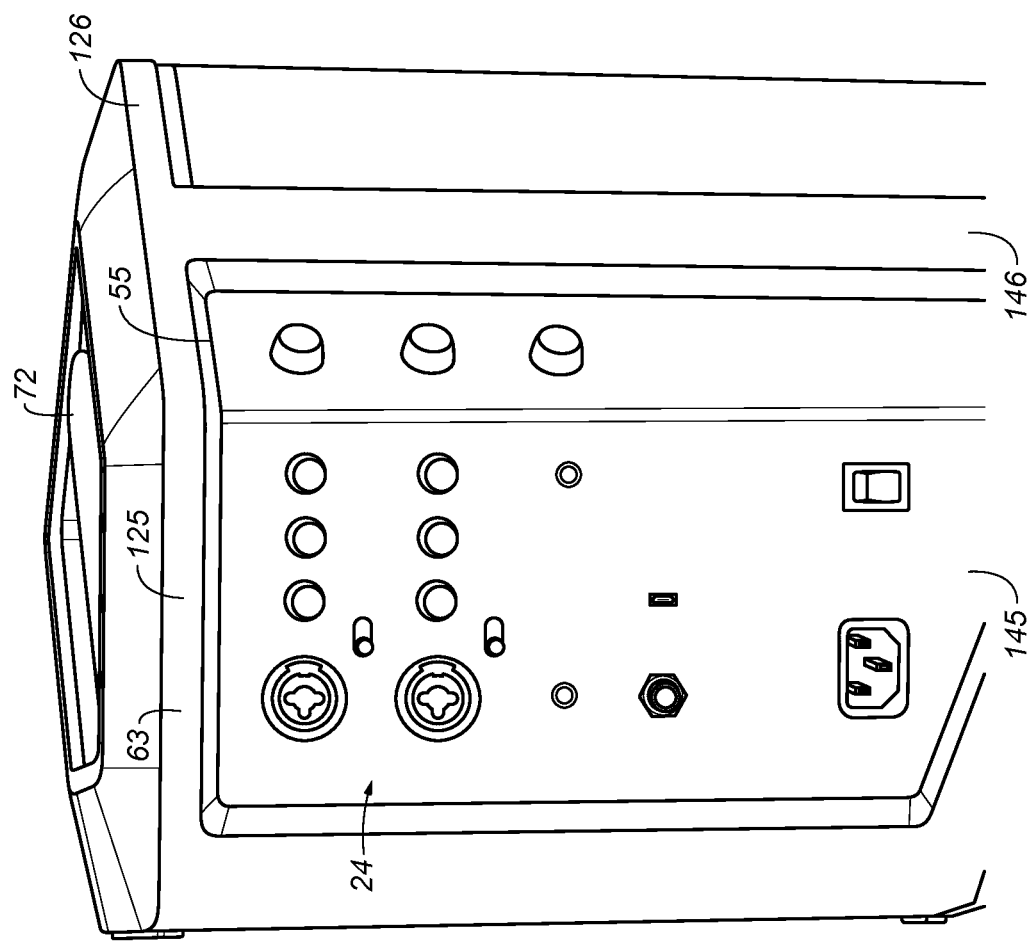

FIG. 4 is another perspective view of the PA loudspeaker system of FIGS. 1A-3 oriented in the first position, including a view of a set of control knobs and switches positioned at one or more sides of the PA loudspeaker system, in accordance with some examples.

FIG. 5A is a perspective view of the PA loudspeaker system of FIGS. 1A-4 exposing a circuit board.

FIG. 5B is a block diagram of the circuit board of the PA loudspeaker system of FIG. 5A.

Figure 6A:
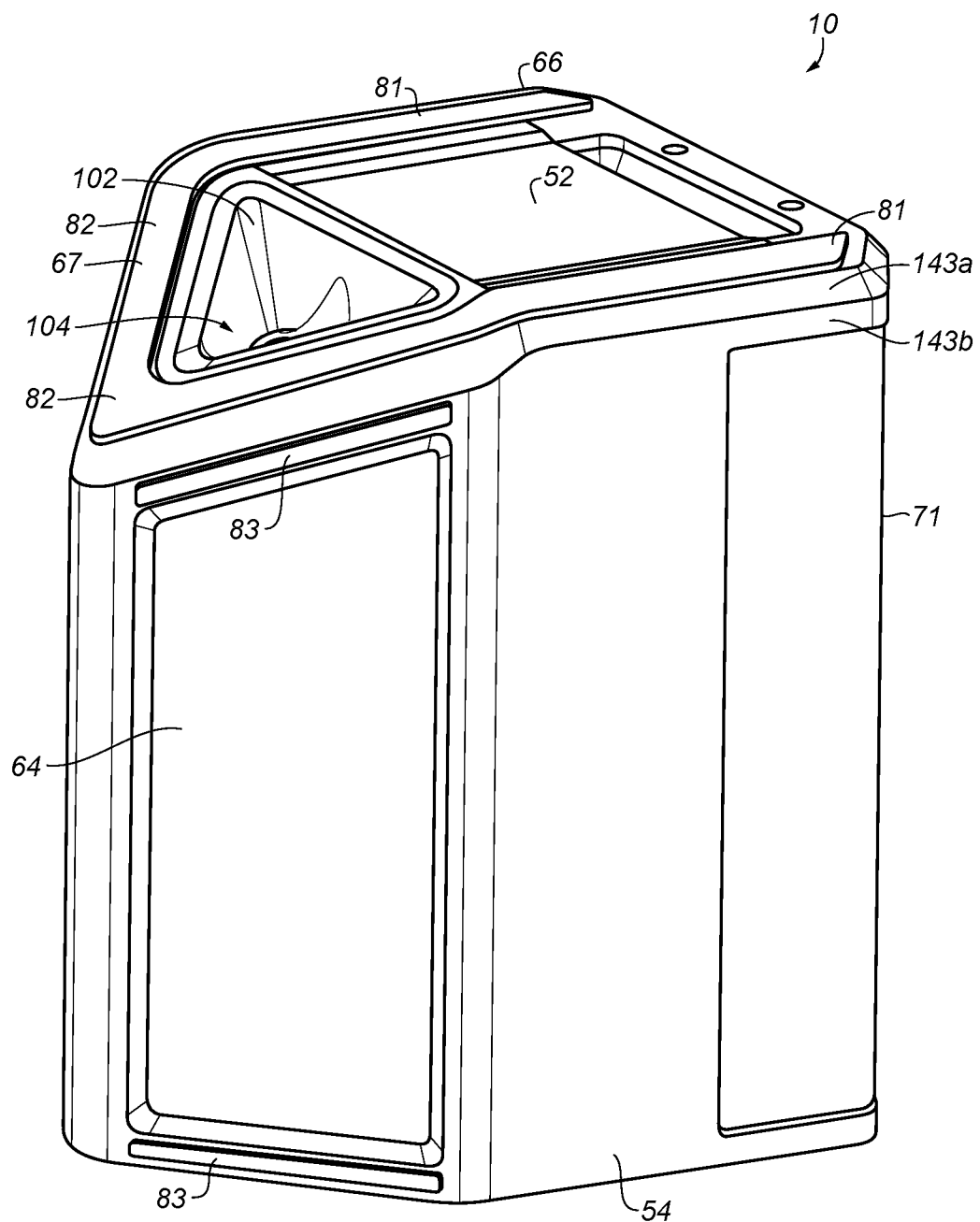

FIG. 6A is another perspective view of a PA loudspeaker system having a pole mount and plurality of compressible feet for positioning the speaker at any one of the three positions of FIGS. 1A-1C, in accordance with some examples.

Figure 6B:
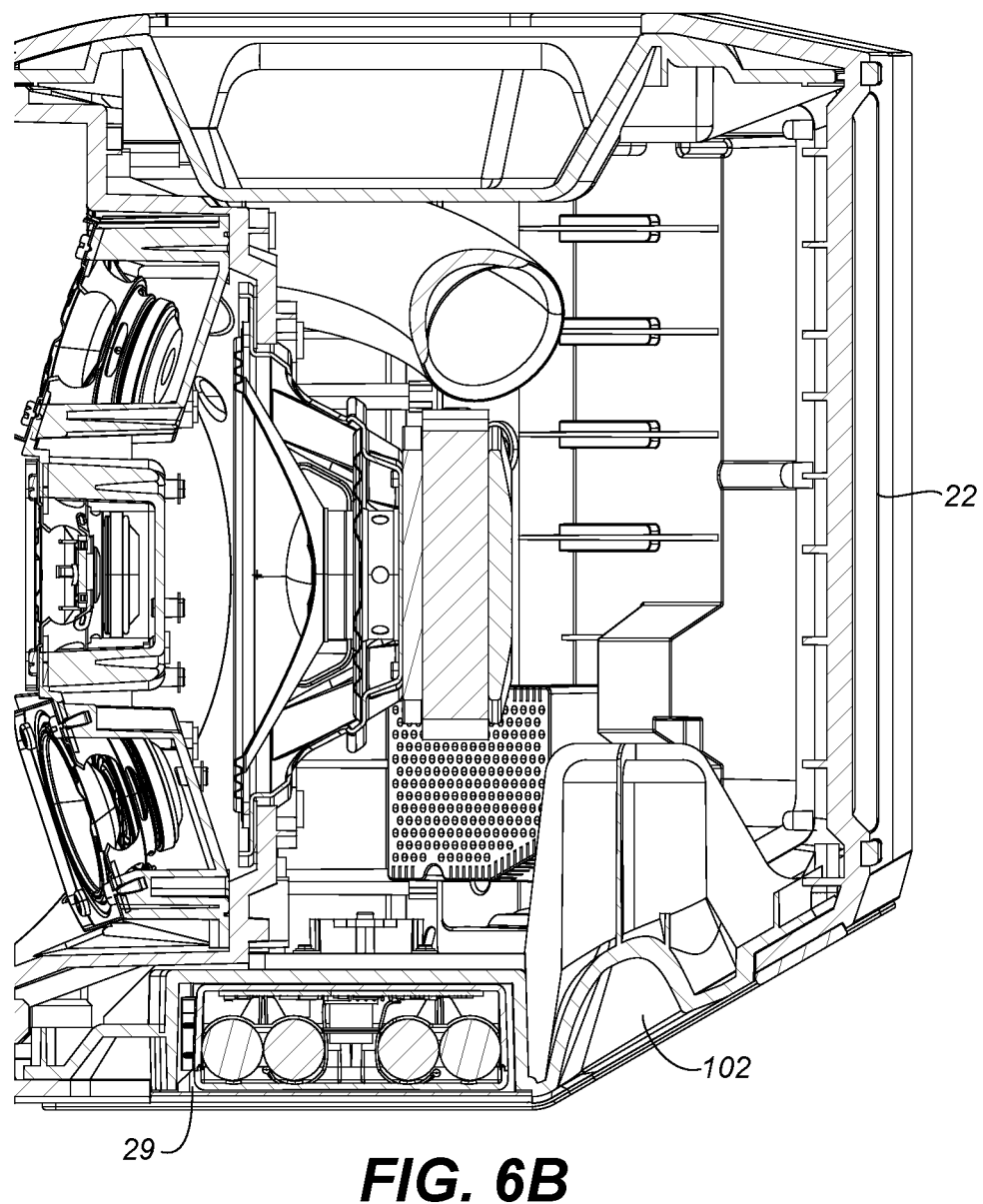

FIG. 6B is a cutaway side view of the PA loudspeaker system of FIG. 6A.

Figure 7:
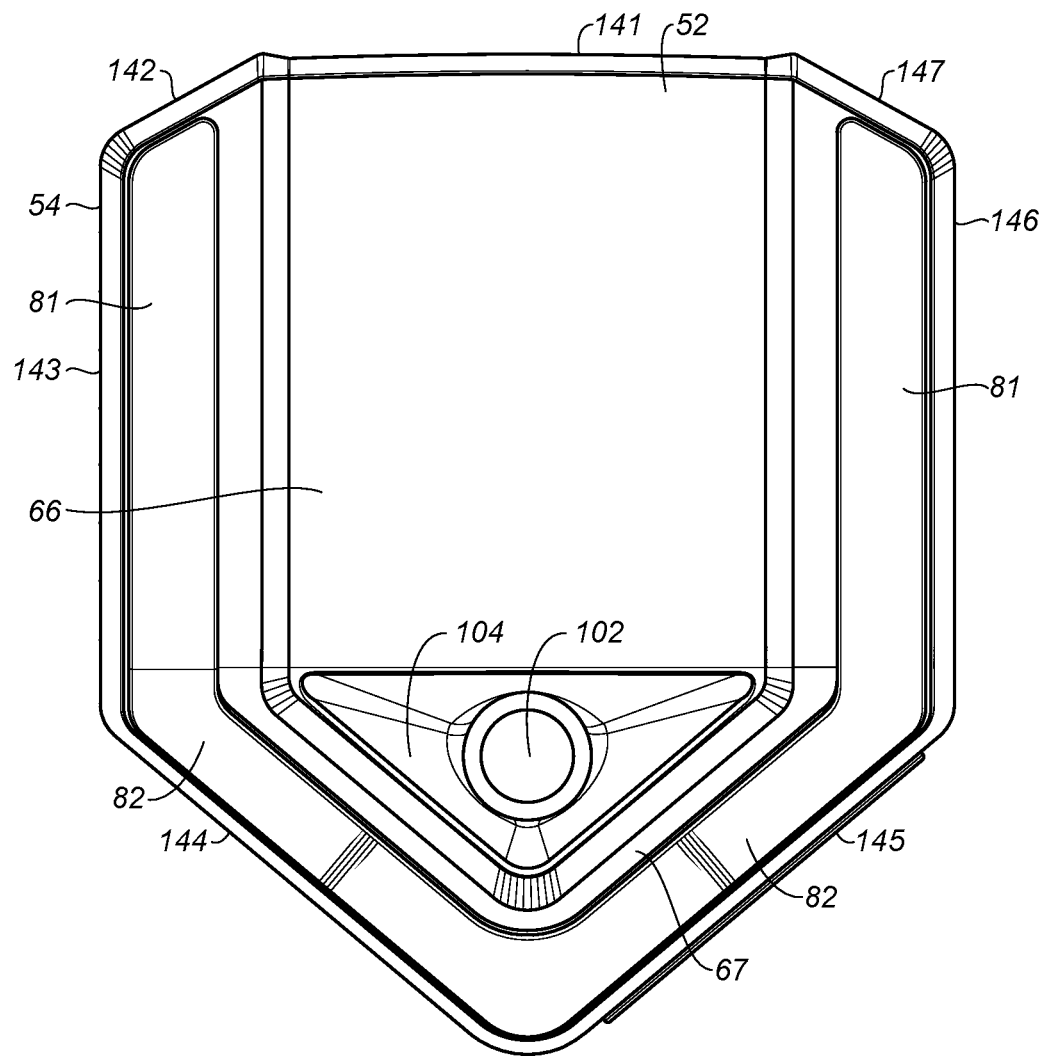

FIG. 7 is a bottom view of a surface of a PA loudspeaker system having a pole mount, in accordance with some examples.

Figure 8:
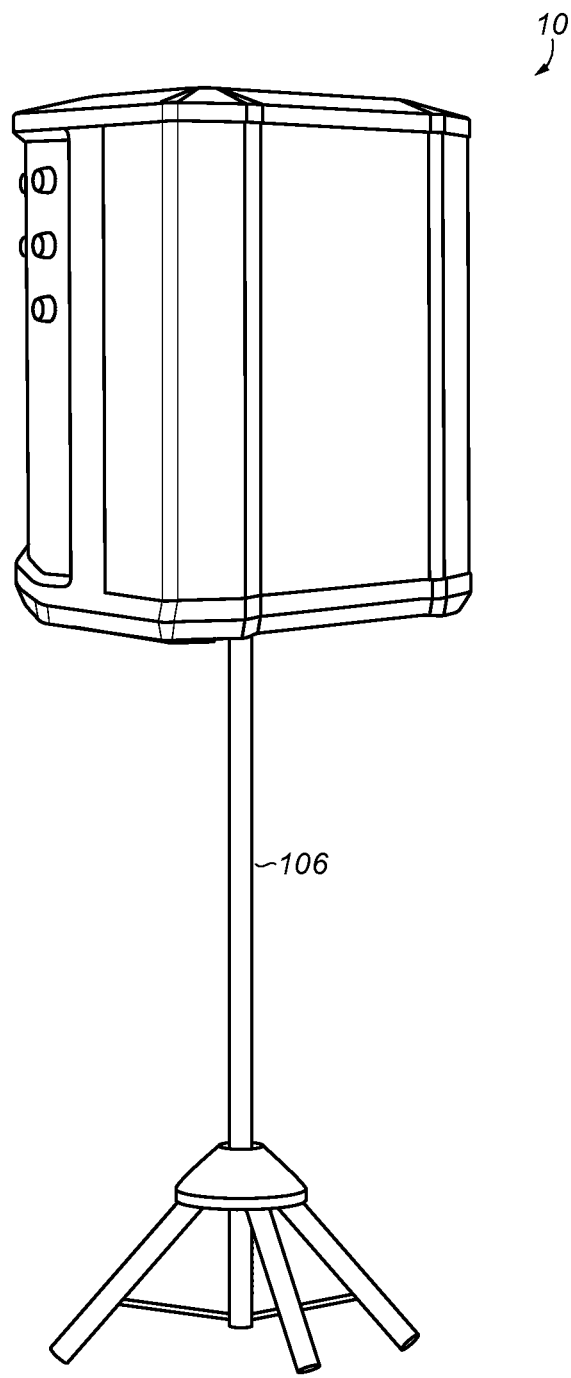

FIG. 8 is a view of the portable powered PA loudspeaker system of FIG. 7 positioned on a pole, in accordance with some examples.

FIG. 9 is an exploded view of a rotatable logo assembly, in accordance with some embodiments.

FIGS. 10A and 10B are perspective views of the rotatable logo assembly coupled to a panel of a PA loudspeaker system oriented in first and second positions, respectively, in accordance with some embodiments.

DETAILED DESCRIPTION

Public address (PA) loudspeaker systems are well-known for amplifying the reproduction of sound to be heard by a group of people. The environment in which portable powered PA loudspeaker systems are used may vary from one location to another. Therefore, there is a need for PA loudspeaker systems to accommodate different areas of coverage depending on the location, or other factors, such as the application, indoor or outdoor positioning, size of audience, and positioning of the loudspeaker system.

PA loudspeaker systems in some examples are constructed with specific target customer segments in mind. For example, a primary use of a PA loudspeaker system may be for a solo musician who requires a voice or instrument amplifier, for example, a guitar or drums, to perform street performances, or for a disk jockey who plays songs for a small audience. In another example, a PA loudspeaker system may be a general purpose electro-acoustic driver for amplifying sound, e.g., voice and/or instruments, in a classroom, home Karaoke event, or other event involving small groups of people. In yet other examples, a PA loudspeaker system may be required for a larger audience, such as an auditorium.

As shown in FIGS. 1A-1C, a portable powered public PA loudspeaker system assembly 10 may include an enclosure 22 (also referred to as a housing or cabinet) having a top portion 51, a base 52, and plurality of side surfaces extending between the top portion 51 and base 52. For example, as shown in FIGS. 1A-1C, the side surfaces may include a first 53, second 54, third 55, fourth 61, fifth 62, sixth 63, and seventh 64 side surface, each extending along a common direction of extension between a periphery the top portion 51 and base 52 to form an interior of the enclosure 22 where a set of omni-directional speakers are positioned, for example, shown in FIG. 3. In other examples, the enclosure 22 may have a different number of side surfaces having various widths or other dimensions, for example, fewer than or more than seven side surfaces. The enclosure 22 is constructed to be oriented vertically, horizontally, or angularly, for example, tangential or non-perpendicular to the ground surface on which the loudspeaker system assembly 10 is positioned.

The top portion 51 may include a plurality of inclined wall portions 121, 122, 123, 124, 125, 126, 127 that each incline, taper, or slope from a bottom region of the top portion 51 abutting the side surfaces to a top region, to provide ruggedness and portability to the assembly 10. Each top wall portion 121-127 has a top horizontal border portion 131, a bottom vertical border portion 132, and a sloped or inclined portion 133 that extends between the top 131 and bottom 132 portions. Thus, the periphery of the bottom region of the top portion 51 formed by the bottom portions 132 of the top wall portions 121-127 may include a lip, and therefore be of a larger parameter than that of the top region formed by the top horizontal border portions 131. The lip formed by the vertical bottom portions 132 of the top wall portions 121-

127 of the top portion 51 of the enclosure 22 may also have a width that is greater than a width of a portion of the enclosure 22 formed by the side surfaces 53, 54, 55, 61, 62, 63, and 64.

The top region of the collective wall portions 121-127 may include a horizontal top border that forms a cavity or recess in the top portion 51 in which a handle 72 may be positioned. The handle 72 allows for easy, single-handed carrying and transport of the portable system 10.

The top portion 51 may have a pentagon shape formed of wall portions 121, 123, 124, 125, and 126. However, the top portion 51 may not have a perfect pentagon shape (i.e., all five sides having a same length), since the wall portions may be of different lengths, and since other wall portions may extend between the five pentagonal sides. For example, as shown, the top portion may include wall portion 122 between wall portion 121 and 123 and wall portion 127 between wall portions 121 and 126, which provide a bevel or cutoff at regions that would otherwise be corners between wall portions 121 and 123 and 121 and 126, respectively. In some examples, top wall portions 121-127, and corners formed therebetween, may align along a common direction of extension as side surfaces 53, 54, 55, 61, 62, 63, and 64, and corners therebetween. For example, a corner region C' between wall portions 121 and 122 may extend along a same axis as corner region C" between side surfaces 53 and 61 as shown in FIG. 1A. In some examples, a base side surface, for example, side surface 142, may be a same width as an enclosure side surface, for example, 61. In other examples, the width of a base side surface may be different than that of a corresponding enclosure surface.

The base 52 on the opposite side of the enclosure 22 as the top portion 51 includes wall portions 141-147, or side portions that extend from a flat bottom surface portion 66 and angled bottom surface portion 67 of the base 52, at a predetermined angle, for example 30 degrees. Flat bottom surface portion 66 is coupled to, integral with, or otherwise aligned with side surfaces 52, 53, and 54. Angled bottom surface portion 67 is coupled to, integral with, or otherwise aligned with side surfaces 63 and 64, which each have a tapered surface to permit the taper of the bottom surface portion 67.

The base wall portions 141-147 of the base each has a first portion (for example, first portion 143a shown in FIG. 6) that inclines, tapers, or slopes from the bottom surface 66, 67, and a second portion (for example, second portion 143b shown in FIG. 6) that extends vertically, e.g., along a same or parallel plane as a corresponding side wall (for example, sidewall 54 shown in FIG. 6). The collective first base wall portions form a border having a smaller parameter than that of the second base wall portions. The border formed of second base wall portions, for example, including 143b in FIG. 6 may include a lip that is wider than a peripheral outer surface of the enclosure 22 formed by the side surfaces 53, 54, 55, 61, 62, 63, and 64.

Therefore, each of the top 51 and bottom base 52 may have a width, circumference, periphery, or related dimension that is greater than that of the peripheral sidewall region formed by the side surfaces 53, 54, 55, 61, 62, 63, and 64 so that some or all of the side surfaces are recessed relative to the top portion 51 and base 52, preventing elements from the walls, i.e., control elements 24, handle 72, and so on, from protruding past the outermost surface of the top portion 51 and base 52, therefore, permitting walls of the top portion 51 and base 52 to be positioned on a flat surface without interference of such elements.

In some examples, the enclosure 22 may be formed, molded, of a single material so that the top portion 51 and base 52 are unitary or integral with at least several of the side surfaces, for example, one piece. In some examples, all side surfaces except first side surface 53 are integral with the top portion 51 and base 52, for example, shown in FIG. 3. In some examples, one or more panels may be positioned over the enclosure 22, at least one panel forming or covering one of the side surfaces. For example, a front grille, screen, or panel 71 may form the first side surface 53 or may be positioned over another layer of material forming the first side surface 53, or may simply cover an opening of the enclosure. In some examples, the front grille 71 extends from the first surface 53 to at least a portion of adjacent side surfaces 62, 62, 54, and/or 55. In other examples, instead of a frame, the panels forming the side surfaces are directly coupled to each other to form a periphery about the interior of the enclosure 22.

In some examples, as shown in FIG. 3, a horn-type woofer 82 and tweeters 84A-84C (generally, 84) may be positioned to output sound waves from the first side surface 53, and through the front grille 71. Also behind the front grille 71 may include two or more acoustic ports 92A, 92B (generally, 92) for permitting an air and/or acoustic flow path through the interior of the enclosure 22, for example, behind the woofer 82. In some examples, as shown in FIG. 3, a sub-enclosure 90 may be coupled to the system frame, for receiving and holding in place the woofer 82, tweeters 84, and acoustic ports 92. Multiple panels and/or sides, for example, side surfaces 53, 61, and 62 may be positioned over the sub-enclosure 90.

As described above, the side surfaces may align along a common direction of extension as the seven walls 127-127 of the top portion 51 and the seven walls 141-147 of the base 52. In doing so, second 54 and third 55 side surfaces may be perpendicular to first side surface 53, and may or may not be in direct contact with first side surface 53 for example, forming corners. Such corners, apexes, or regions of intersection of side surfaces 63 and 64 may be rounded, or may include another side surface, for example, similar to the smaller-width side surfaces 61 and 62. Instead of such corners, other examples may include the fourth 61 and fifth 62 side surfaces extending from the first side surface 53 to the second 54 and third 55 side surfaces, respectively. A width of the fourth 61 and fifth 62 side surfaces is preferably less than the widths of the first through third 53-55 side surfaces, for example, as shown.

The enclosure 22, in particular, the various surfaces of the enclosure 22, is constructed for orientation in different aiming positions, depending on a desired coverage area of the output of the loudspeaker system assembly 10, for example, shown in FIGS. 2A-2C, where each orientation establishes the pitch, roll, and yaw angle of the front or first side surface 53 of the loudspeaker system assembly 10 from where sound generated from the speakers 82, 84 facing the first side surface 53 is output.

The PA loudspeaker system assembly 10 can be easily positioned by hand to deliver different coverage patterns depending on position, orientation, and configuration of the speakers so that a user can optimize the sound output from the loudspeaker system assembly 10 for playing at floor level, on a stage, facing raked seats or bleachers, and so on. For example, as shown in FIGS. 1A and 2A, the assembly 10 can be positioned on a table, or as shown in FIGS. 1B and 2B, tipped at an angle on a ground surface, or as shown in FIGS. 1C and 2C, also positioned at an angle on a ground surface, or as shown in FIG. 8, mounted on a pole or the like.

In some examples, the circuit board 91, e.g., printed circuit board (PCB), of the PA loudspeaker system assembly 10 includes an equalizer 40 (see FIGS. 5A and 5B) that automatically equalizes the loudspeaker system assembly 10 in response to a determined orientation, for example, shown in FIGS. 1A, 1B, and 1C, respectively. In particular, the equalizer 40 may automatically change equalization parameters to maintain optimum tonal balance for each coverage pattern shown in Fits. 2A-2C, respectively. For example, as shown in FIGS. 1A and 2A, the (PA) loudspeaker system assembly 10 in a first position equalizes and outputs a source of audio having a first acoustic coverage area C1 for a particular listening audience. Here, when the assembly 10 is positioned on a table or the like, the coverage area C1 allows for a narrow vertical angle that maintains acoustic coverage within a height of an audience (sitting or standing), but provides wide horizontal coverage for a large crowd, for example, 140 degrees or more.

As shown in FIGS. 1B and 2B, the (PA) loudspeaker system assembly 10 in a second position, for example, angled 30 degrees relative to the vertical position in FIG. 1A, equalizes and outputs a source of audio having a second acoustic coverage area C2 for a particular listening audience. Here, when the assembly is positioned on the floor or other ground surface, the coverage area C2 allows a narrow vertical coverage angle to direct an acoustic output at the audience, for example, within range of the ears of listeners in the audience, but at a wider horizontal coverage angle to cover a wider, more dispersed audience.

As shown in FIGS. 1C and 2C, the (PA) loudspeaker system assembly 10 in a third position equalizes and outputs a source of audio having a third acoustic coverage area C3 for a particular listening audience. Here, a monitor mode coverage pattern is provided that allows for a large vertical coverage angle but a smaller or narrower horizontal coverage angle, e.g., 40 degrees, to keep monitor noise away from other performers.

In some examples, an orientation sensor 42, for example, an accelerometer or the like, is used to detect an orientation and provides a detected orientation result to the equalizer 40, which provide different equalization (EQ) settings based on a detected orientation of the loudspeaker system assembly 10. The orientation sensor 42 may be co-located with the equalizer 40, or be part of the equalizer 40 on the circuit board 91 as shown in FIGS. 5A and 5B, which in turn may be positioned in the enclosure 22. In operation, the orientation sensor works with a processing algorithm to provide an orientation value to an equalizer 40. Each orientation, e.g., vertical, angular, and horizontal shown in FIGS. 1A-1C, respectively, is associated with a different baseline for EQ settings for output of the speakers in the enclosure 22. Each orientation, or speaker position, may have an associated EQ setting for output of audio from the speakers 82, 84, which is activated by a control signal provided by the sensor when the loudspeaker system assembly 10 is oriented in the particular position. Different EQ settings in different positions do not change the coverage patterns, or more specifically, the horizontal and vertical coverage angles corresponding to coverage areas C1-C3.

For example, as shown in FIG. 1A, in a first position, or vertical position, the horizontal surface 66 of the base 52 is positioned on a ground surface, object surface, or other surface that supports the weight and size of the loudspeaker system assembly 10.

As shown in FIG. 1A, when the loudspeaker system assembly 10 is in the first position, for example, a vertical orientation, a set of control elements 24 such as volume knobs, power switch, and so on, extend in a vertical direction along the third side surface 55. However, the control elements 24 do not extend beyond the outermost edges of the top portion 51 and base 52, respectively, particular, walls 125 and 126 of the top portion 51 and walls 145 and 146 of the base 52. As shown in FIG. 4, additional control elements 24, such as reverb, bass, and treble knobs, may be positioned at sixth side surface 63, which is tangential to the third side surface 55. Other control elements 24, such as input connectors, on/off switches, microphone/line switches, instrument jacks, stereo inputs, auxiliary inputs, and so on may be located at third side surface 55 and/or sixth side surface 63. For example, control elements 24 may include tuning knobs, e.g., bass, treble, reverb, on sixth side surface 63, and may be set prior to use. The tuning knobs may be prevented from further adjustments after an initial setting. In another example, control elements 24 on third side surface 55 may include a volume knob, which may be adjusted accordingly.

In a second position, as shown in FIG. 1B, the angled surface 67 of the base 52 is positioned on a ground surface, object surface, or other surface that supports the weight and size of the loudspeaker system assembly 10. In the second position shown in FIG. 1B, control elements 24 are visible for accessibility by a user, similar to the first position shown in FIG. 1B.

In a third position, e.g., horizontal position, as shown in FIG. 1C, the seventh 64 side surface of the enclosure 22 is positioned on a ground surface, object surface, or other surface that supports the weight and size of the loudspeaker system assembly 10. The panel 71 at the first side surface 53 is oriented so that a third acoustic coverage area C3 is provided for a particular listening audience, for example, a single performer as shown in FIG. 2C. The loudspeaker assembly 10 is turned or oriented so that the narrow vertical coverage angle, for example, 40 degrees, becomes a horizontal coverage angle, for example, 40 degrees. Also in the third position, the handle 72 is positioned on a side of the loudspeaker system assembly 10. The control knobs 24 extend horizontally, instead of vertically, along side surfaces 55 and 63.

A feature of the loudspeaker system assembly 10 is that the layout of the loudspeaker system assembly 10 is aesthetically pleasing to a viewer regardless of the orientation, i.e., either the first, second, or third position, shown in FIGS. 1A-1C, respectively, due to the location of the control elements 24 along two adjacent sidewalls, and the recessed side surfaces relative to the top portion 51 and base 52, so that the handle 72, control elements 24, and/or other protruding elements are hidden or minimized from view.

As shown in FIGS. 5A and 5B the portable powered public address (PA) loudspeaker system assembly 10 includes a circuit board 91, for example, a PCB or the like. The circuit board 91 may include signal electronics comprising circuitry, digital signal processor, and related elements for mixing, equalizing, amplifying, and or filtering an input signal to the speaker 10. For example, equalizer 40 may be implemented as analog circuitry or as digital circuitry executing instructions from a microprocessor-readable memory or a combination thereof known to a skilled artisan in the electronic arts. The control elements 24, for example, knobs, switches, and so on, may be in direct or indirect communication with the circuit board 91, and can modify features, outputs, and so on produced by the circuit board 91 by manual changes to the control knobs 24.

The circuit board 91 may also include an orientation sensor 42, also described above, that controls the EQ settings of the equalizer 40 to modify an input signal according to one of the vertical, angular, and horizontal orientations shown in FIGS. 1A-1C, respectively.

The circuit board 91 may include a wireless data interface device 36, for example, including a Bluetooth computer chip or the like, that in some examples is positioned on a circuit board 91 in the enclosure 22. The Bluetooth antenna 37 is at or proximal the top portion 51 of the enclosure as shown in FIG. 5A. Although Bluetooth communications are described, other short-range electronic communications between the loudspeaker system assembly 10 and smartphone, instrument, music generating device, IEEE 802.16 WiMax technology and protocols, or other electronic devices, systems, and/or communication infrastructures for the wireless and/or wired communications transmission of data (audio, visual, and information packets) or other mobile electronic device. The Bluetooth device 36 may include, or be in communication with an omni-directional antenna, Bluetooth technology communications circuitry, RF wireless transceiver communications circuitry, Bluetooth technology, and RF wireless communications circuitry, in conjunction with an omni-directional antenna, or other electronics that for the receive and transmit wireless and/or wired data packets and information to and from the mobile electronic device.

Regardless of orientation or position of the speaker 10, i.e., shown in FIGS. 1A-1C, the Bluetooth interface 36, or more specifically, omni-direction antenna, can establish or maintain communication with an electronic device via a Bluetooth communication due to the location of the Bluetooth interface 36 on the circuit board 91, ensuring proper connection of the signals in all possible orientations.

As shown in FIG. 6, the loudspeaker system assembly 10 includes a plurality of cushions, compressible feet, or the like that are coupled to various surfaces of the enclosure 22 and formed of rubber, plastic, and/or other suitable material for supporting the weight of the loudspeaker system assembly 10 in any and all of the three orientations shown in FIGS. 1A-1C. The physical components and processes necessary to accomplish the function of the compressible feet are well known in the art and will not be described herein.

In particular, a first foot 81 or pair of feet receive a weight of the speaker 10 when the speaker 10 is in the first position shown in FIG. 1A, a first foot 81 may extend to a second position shown in FIG. 1B. A second foot 83 or pair of feet receive a weight of the speaker 10 when the speaker 10 is in the third position shown in FIG. 1C. Each of the feet 81, 82 is constructed and arranged to be elongated, for extending along a peripheral edge of a respective surface of the enclosure. In some examples, a pair of compressible feet may refer to a single length forming feet at two different edges. In some examples, a same unitary length of material is used to form the first feet 81, for example, shown in FIGS. 6 and 7.

As shown in FIGS. 6A and 7, the first pair of compressible feet 81 is positioned at edges of the flat bottom surface 66 aligned with side surfaces 54 and 55 so that when the speaker 10 is oriented in the first position, the speaker 10 rests on the first pair of compressible feet 81 at the flat bottom surface 66. A portion of the first pair of compressible feet 81 is positioned at two edges forming the triangle-shaped and angled bottom surface 67 aligned with side surfaces 63 and 64, so that when the speaker 10 is oriented in the second position, the speaker 10 rests on a portion of the first pair of compressible feet 81 at the angled bottom surface 67. The third pair of compressible feet 83 is positioned at two opposite edges of the side surface 64 so that when the speaker 10 is oriented in the third position, the speaker 10 rests on the third pair of compressible feet 83 at the side surface 64.

As shown in FIGS. 6-8, the speaker may include a pole mount 102 positioned in a tapered cavity 104 at the angled bottom surface 67. The pole mount 102 includes a cylindrical element that is constructed and arranged to receive a rod, pole, or the like of a speaker stand, for example, a tripod 106 as shown in FIG. 8, so that the speaker 10 can be positioned at a height above a floor level. Even though the pole mount 102 is positioned in the angled bottom surface 67, the pole mount 102 extends vertically so that the speaker 10 is oriented in the first position shown in FIG. 1A, i.e., a vertical orientation. The tapered cavity 104 permits a user to navigate the pole 102 to fit into the pole mount 102 with ease.

The location of the pole mount 102 and tapered configuration of the angled bottom surface 67 also prevent the battery 29 inside the enclosure 22 (see FIG. 6B) from overheating the circuit board 91 or other heat-sensitive electronic components. Also, the pole mount 102 towards the rear of the enclosure 22 provides more room for the battery 22 at the bottom surface. Thus, the battery orientation in the optimal direction, i.e., flat on its widest surface, does not require the battery 29 to be at a further depth inside the enclosure 22. Also, the battery cells can be on a same plane to prevent or reduce the risk of unequal heating of the battery cells. Also, the location of the battery 29 in this manner allows for more component cooling on the PCB 91.

Therefore, the pole mount location has a benefit in that by placing the pole mount near the rear of the enclosure and also having a bevel to it, it is much easier for a user to see and find the pole mount location to insert the pole. Also, by locating the pole mount 102 to the rear, there is room to keep the battery 29 away from the heat generated sources in the system—transducers and power electronics—which keeps the battery at a cooler temperature. Also, by moving the pole mount 102 to the rear, the battery 29 can be located at the bottom of the system which helps with center of gravity and provides improved stability with/without battery pack in this location.

Referring again to FIGS. 1A-1C, another feature is that a rotatable nameplate assembly 110 having a nameplate, attachable logo or other identifying element may be coupled to the front grille 71, and may be rotated relative to the front grille 71 to accommodate any of the positions of the loudspeaker system assembly 10 shown in FIGS. 1A-1C. In some examples, the nameplate assembly 110 or the like may rotate to four different positions, 90 degrees apart from each other.

As shown in FIG. 9, the nameplate assembly 110 may include a nameplate 202, an alignment part 204, and a spring-loaded element 206. The nameplate 202 includes a pin 203 that extends from a rear section of the nameplate 202 for insertion into a hole 205 in the alignment part 204. The pin 203 and hole 205 extend along an axis about which the nameplate 202 rotates, for example, from a position P1 shown in FIGS. 1A and 1B to a position P2 shown in FIG. 1C.

In some examples, as shown in FIGS. 10A and 10B, the nameplate 110 is coupled to the front grille 71, which in turn is positioned over the speaker assembly at the opening of the enclosure 22. The alignment part 204 can be in the shape of a square, rectangular, or other non-circular shape. Here, the alignment part 204 can align in a square, rectangle, or other non-circular shape cut into the surface of the grill 71, i.e., a recess or the like in the grill 71 to prevent the alignment part 204 from rotating when the nameplate 202 is rotated. The pin 203 of the nameplate 202 and hole 205 in the alignment part 204, on the other hand, are circular, to permit rotation of the nameplate 202. Also, a feature is that the user does not have to remove the nameplate 202, then reinsert it in a different position. Also, the user does not have to apply a force on the nameplate 202 to pull on the nameplate 202 away from the grille 71 in order to rotate the nameplate 202. Instead, the user simply rotates the nameplate 202 about its axis along which the pin 203 and alignment part hole extends.

The spring-loaded element 206 is positioned about a cylindrical rear portion 207 of the alignment part 204 through which the nameplate pin 203 extends. The spring-loaded element 206 includes a spring positioned about the rear portion 207 of the alignment part 204 for applying a force, more specifically, holds the nameplate 202 against the alignment part 204, when in an uncompressed state. The spring-loaded element 206 operates to hold a feature 215 on a backside of the nameplate 202 against a back portion comprising four ramp-shaped features 211, 212, 213, and 214. In particular, the back portion of the alignment part 204 includes the four features 211, 212, 213, 214 constructed and arranged to mate with a feature 215 on a backside of the nameplate 202. A retainer 208 in positioned at an opposite side of the grille 71 and has a protruding portion that extends through an opening 79 in the grille 71, the spring 206, and alignment part 204 to couple with the nameplate pin 203, thereby compressing the spring 206 between the retainer 208 and the alignment part 204. Therefore, the nameplate 202 is fixedly coupled to the alignment part 204 in one of four different rotatable positions, each 90 degrees from each other. Therefore, when a user rotates the nameplate 202, the nameplate 202 remains pressed against the back portion. When the user completes the rotation, the spring-loaded element 206 snaps the nameplate 202 in place in its new oriented position.

The ramp-shaped features 211-214 are configured so that as the nameplate 202 rides up, or moves along, a ramp of a desired feature 211-214, spring force is increased. At the end of the ramp of the desired feature 211-214, the nameplate 202 snaps into place and cannot be rotated in an opposite direction.

It is to be understood that the foregoing description is intended to illustrate and not to limit the scope of the invention, which is defined by the scope of the appended claims. Other embodiments are within the scope of the following claims.

What is claimed is:

1. A loudspeaker system, comprising:
   an enclosure having a first surface, a second surface, and a third surface;
   a speaker arrangement in the enclosure that outputs sound through a side surface of the enclosure, the speaker arrangement including:
      a single first speaker positioned in a central region of the enclosure; and
      a plurality of second speakers extending between the first speaker and the side surface of the enclosure, wherein the enclosure is constructed and arranged for positioning the first surface on a flat surface to output audio shaped for a first acoustic coverage area, positioning the second surface on the flat surface to output audio shaped for a second acoustic coverage area, and positioning the third surface on the flat surface to output audio shaped for a third acoustic coverage area; and
   an equalization device that provides:
      (1) a first equalization parameter for equalizing and outputting the audio shaped for the first acoustic coverage area in response to a detection of a first orientation of the loudspeaker system when the first surface of the enclosure is positioned on the flat surface and maintaining the single first speaker and plurality of second speakers to provide the first acoustic coverage area having a vertical coverage angle and a horizontal coverage angle that maintains the first acoustic coverage within at least a height of an audience;
      (2) a second equalization parameter for equalizing and outputting the audio shaped for the second acoustic coverage area in response to a detection of a second orientation of the loudspeaker system when the second surface of the enclosure is positioned on the flat surface and maintaining the single first speaker and plurality of second speakers to provide the second acoustic coverage area having a vertical coverage angle less than the vertical coverage angle of the first acoustic coverage area and having a horizontal coverage angle greater than the horizontal coverage angle of the first acoustic coverage area to direct the output audio shaped for the second acoustic coverage area at a wider, more dispersed audience than the first acoustic coverage area, and
      (3) a third equalization parameter for equalizing and outputting the audio shaped for the third acoustic coverage area in response to a detection of a third orientation of the loudspeaker system when the third surface of the enclosure is positioned on the flat surface and maintaining the single first speaker and plurality of second speakers to provide the third acoustic coverage area having a horizontal coverage angle less than the horizontal coverage angle of the first or second acoustic coverage area.

2. The loudspeaker system of claim 1, wherein the first orientation is a vertical orientation, the second orientation is an angular orientation, and the third orientation is a horizontal orientation.

3. The loudspeaker system of claim 1, further comprising:
   a base including the first surface;
   a top surface; and
   a plurality of side surfaces including the third surface.

4. The loudspeaker system of claim 3, wherein the top surfaces include a tapered border that forms a cavity, and further includes a handle in the cavity.

5. The loudspeaker system of claim 4, further comprising a plurality of control elements extending from at least one side surface of the plurality of side surfaces, wherein a width of each of the top portion and base is greater than a width of a combination of the control elements and a portion of the enclosure formed by the at least one side surface.

6. The loudspeaker system of claim 4, wherein the control elements are visible and accessible to a user in each of the first, second, and third positions of the enclosure.

7. The loudspeaker system of claim 4, wherein the base includes a plurality of wall portions that extend from the flat bottom surface and angled bottom surface each aligned with a side surface of the plurality of side surfaces.

8. The loudspeaker system of claim 1, wherein the first surface comprises a flat bottom surface and the second surface comprises an angled bottom surface extending from the flat bottom surface, wherein the weight of the loudspeaker system rests on the flat bottom surface when at the first orientation, and wherein the weight of the loudspeaker system rests on the angled bottom surface when at the second orientation.

9. The loudspeaker system of claim 7, further comprising:
a first compressible foot at the flat bottom surface and the angled bottom surface; and
a second compressible foot at a different side surface than the side surface.

10. The loudspeaker system of claim 7, further comprising a pole mount positioned in the angled bottom surface.

11. The loudspeaker system of claim 1, further comprising a circuit board comprising a wireless data interface device constructed and arranged to establish or maintain a communication with an electronic device in any of the first, second, or third orientations of the enclosure.

12. The loudspeaker system of claim 11, further comprising an omni-direction wireless antenna at the top portion in communication with the wireless data interface device on the circuit board.

13. The loudspeaker system of claim 1, further comprising a rotatable nameplate assembly that rotates to accommodate either the first, second, or third orientation of the enclosure.

14. The loudspeaker system of claim 13, wherein the rotatable nameplate assembly comprises a nameplate in communication with an alignment part, the alignment part including four elements that permit rotation of the nameplate in one of four different positions, each 90 degrees from each other.

15. A loudspeaker system, comprising:
an enclosure having a first surface, a second surface, and a third surface;
a speaker arrangement in the enclosure that outputs sound through a side surface of the enclosure, the speaker arrangement including:
a single first speaker positioned in a central region of the enclosure; and
a plurality of second speakers between the first speaker and the side surface of the enclosure, wherein the enclosure is constructed and arranged for resting a weight of the loudspeaker system on a flat surface via the first surface when the first surface is positioned on the flat surface to output audio shaped for a first acoustic coverage area, resting the weight of the loudspeaker system on the flat surface via the second surface when the second surface is positioned on the flat surface to output audio shaped for a second acoustic coverage area, and resting the weight of the loudspeaker system on the flat surface via the third surface when the third surface is positioned on the flat surface to output audio shaped for a third acoustic coverage area; and
an equalization device that provides:
(1) a first equalization parameter for equalizing and outputting the audio shaped for the first acoustic coverage area in response to a detection of a first orientation of the loudspeaker system when the first surface of the enclosure is positioned on the flat surface and maintaining the single first speaker and plurality of second speakers to provide the first acoustic coverage area having a vertical coverage angle and a horizontal coverage angle that maintains the first acoustic coverage within at least a height of an audience,
(2) a second equalization parameter for equalizing and outputting the audio shaped for the second acoustic coverage area in response to a detection of a second orientation of the loudspeaker system when the second surface of the enclosure is positioned on the flat surface and maintaining the single first speaker and plurality of second speakers to provide the second acoustic coverage area having a vertical coverage angle less than the vertical coverage angle of the first acoustic coverage area and having a horizontal coverage angle greater than the horizontal coverage angle of the first acoustic coverage area to direct the output audio shaped for the second acoustic coverage area at a wider, more dispersed audience than the first acoustic coverage area, and
(3) a third equalization parameter for equalizing and outputting the audio shaped for the third acoustic coverage area in response to a detection of a third orientation of the loudspeaker system when the third surface of the enclosure is positioned on the flat surface and maintaining the single first speaker and plurality of second speakers to provide the third acoustic coverage area having a horizontal coverage angle less than the horizontal coverage angle of the first or second acoustic coverage area.

16. The loudspeaker system of claim 15, wherein the first orientation is a vertical orientation, the second orientation is an angular orientation, and the third orientation is a horizontal orientation.

17. The loudspeaker system of claim 15, further comprising:
a base including the first surface;
a top surface;
a plurality of side surfaces including the third surface; and
a pole mount positioned in the second surface of the enclosure for receiving a pole for positioning the loudspeaker system above the flat surface.

18. A loudspeaker system, comprising:
an enclosure, comprising:
a top portion;
a base;
a plurality of side surfaces extending between the top portion and the base;
a speaker arrangement in the enclosure that outputs sound through a first side surface of the plurality of side surfaces, the speaker arrangement including a single first speaker positioned in a central region of the enclosure and a plurality of second speakers smaller than the first speaker and extending between the first speaker and the first side surface, wherein the enclosure is constructed and arranged for positioning at a first position having a vertical orientation, a second position having an angular orientation, and a third position having a horizontal orientation; and
an equalization device that provides:
a first equalization parameter for equalizing and outputting the sound in response to a detection of the vertical orientation and maintaining the single first speaker and plurality of second speakers to provide a first acoustic coverage area having a vertical coverage angle and a horizontal coverage angle that maintains the first acoustic coverage within at least a height of an audience;
(2) a second equalization parameter for equalizing and for outputting the sound in response to a detection of the angular orientation and maintaining the single first speaker and plurality of second speakers to provide a second acoustic coverage area having a vertical coverage angle less than the vertical coverage angle of the first acoustic coverage area and having a horizontal coverage angle greater than the horizontal coverage angle of the first acoustic coverage area to direct the output sound shaped for the second acoustic coverage area at a wider, more dispersed audience than the first acoustic coverage area; and
(3) a third equalization parameter for equalizing and outputting the sound in response to a detection of the horizontal orientation and maintaining the single first speaker and plurality of second speakers to provide a third acoustic coverage area having a horizontal coverage angle less than the horizontal coverage angle of the first or second acoustic coverage area.

19. The loudspeaker system of claim 18, further comprising a pole mount positioned in the base of the enclosure for receiving a pole for positioning the loudspeaker system above a ground surface.

20. The loudspeaker system of claim 18, further comprising a circuit board comprising a wireless data interface device constructed and arranged to establish or maintain a communication with an electronic device in any of the first, second, or third positions of the enclosure.

\* \* \* \* \*